United States Patent
Itoh

(10) Patent No.: US 7,844,080 B2
(45) Date of Patent: *Nov. 30, 2010

(54) IMAGE PROCESSING SYSTEM AND IMAGE PROCESSING METHOD, AND COMPUTER PROGRAM

(75) Inventor: Atsushi Itoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1166 days.

This patent is subject to a terminal disclaimer.

(21) Appl. No.: 11/333,385

(22) Filed: Jan. 18, 2006

(65) Prior Publication Data

US 2006/0290964 A1    Dec. 28, 2006

(30) Foreign Application Priority Data

Jun. 23, 2005   (JP)   ............... 2005-182846

(51) Int. Cl.
  G06K 9/00   (2006.01)
  G06K 15/00  (2006.01)
  H04N 1/46   (2006.01)

(52) U.S. Cl. .................. 382/112; 358/114; 358/500

(58) Field of Classification Search .......... 382/100, 382/112, 164, 165, 181–188, 202, 224, 225, 382/236, 309, 162; 715/513, 514–517; 707/101, 707/500, 502; 705/1; 358/1, 14, 530–540, 358/504; 250/559.01–559.2; 708/1.14, 530–540; 702/37

See application file for complete search history.

(56) References Cited

U.S. PATENT DOCUMENTS

| | | | |
|---|---|---|---|
| 6,043,823 A * | 3/2000 | Kodaira et al. .............. 345/619 |
| 6,088,709 A | 7/2000 | Watanabe |
| 6,751,779 B1 | 6/2004 | Kurosawa et al. |
| 7,218,783 B2 * | 5/2007 | Bargeron et al. ............ 382/188 |
| 2003/0237046 A1 * | 12/2003 | Parker et al. ................ 715/513 |
| 2004/0019499 A1 * | 1/2004 | Murashita ...................... 705/1 |

(Continued)

FOREIGN PATENT DOCUMENTS

JP    A-08-095965    4/1996

(Continued)

OTHER PUBLICATIONS

Mar. 9, 2010 Office Action issued in Japanese patent application No. 2005-182846 (with translation).

*Primary Examiner*—Samir A. Ahmed
*Assistant Examiner*—Mehdi Rashidian
(74) *Attorney, Agent, or Firm*—Oliff & Berridge, PLC

(57) ABSTRACT

An image processing system includes a modified area deciding unit, a modified area correlation deciding unit, a display selecting unit and a displaying unit. The modified area deciding unit executes processing of deciding a modified area containing a pixel area, which is distinguished as postscript information, based on input image data. The modified area correlation deciding unit specifies a related information area corresponding to the modified area, which is decided by the modified area deciding unit. The modified area correlation deciding unit executes processing of deciding a correlation between mutual areas. The display selecting unit selects the postscript information and related information of the postscript information, based on the correlation between the mutual areas, which are decided by the modified area correlation deciding unit. The displaying unit executes processing of displaying output data in response to a selecting mode of the display selecting unit.

21 Claims, 16 Drawing Sheets

U.S. PATENT DOCUMENTS

2005/0276439 A1 * 12/2005 Ishii .......................... 382/100

FOREIGN PATENT DOCUMENTS

| JP | A 10-255027 | 9/1998 |
| JP | A-2001-101435 | 4/2001 |
| JP | 2001-283231 * | 10/2001 |
| JP | A-2002-132460 | 5/2002 |
| JP | A-2003-143394 | 5/2003 |
| JP | A-2003-296313 | 10/2003 |

* cited by examiner

FIG. 9

| ORIGINAL | POSTSCRIPT DOCUMENT 1 (ONCE POSTSCRIBED) | | POSTSCRIPT DOCUMENT 2 (TWICE POSTSCRIBED) | | POSTSCRIPT DOCUMENT 3 (THREE-TIMES POSTSCRIBED) | |
|---|---|---|---|---|---|---|
| | POSTSCRIPT INFORMATION | RELATED INFORMATION | POSTSCRIPT INFORMATION | RELATED INFORMATION | POSTSCRIPT INFORMATION | RELATED INFORMATION |
| LAYOUT A | | | | | | |
| LAYOUT B | POSTSCRIPT P1 | | | | ⋮ | ⋮ |
| LAYOUT C | POSTSCRIPT P2 | LAYOUT C | | | | |
| LAYOUT D | POSTSCRIPT P3 | | POSTSCRIPT Q1 | POSTSCRIPT Q1 | | |
| | | | POSTSCRIPT Q2 | POSTSCRIPT P1 | | |

FIG. 12
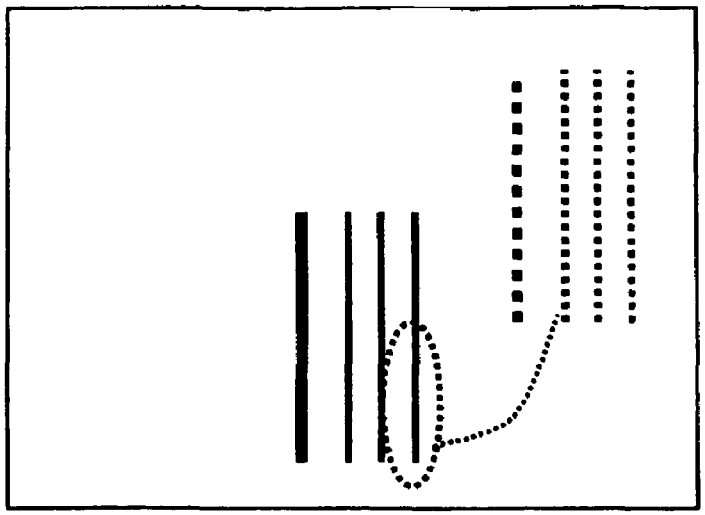
(a) TOTAL POSTSCRIPT INFORMATION AND RELATED INFORMATION
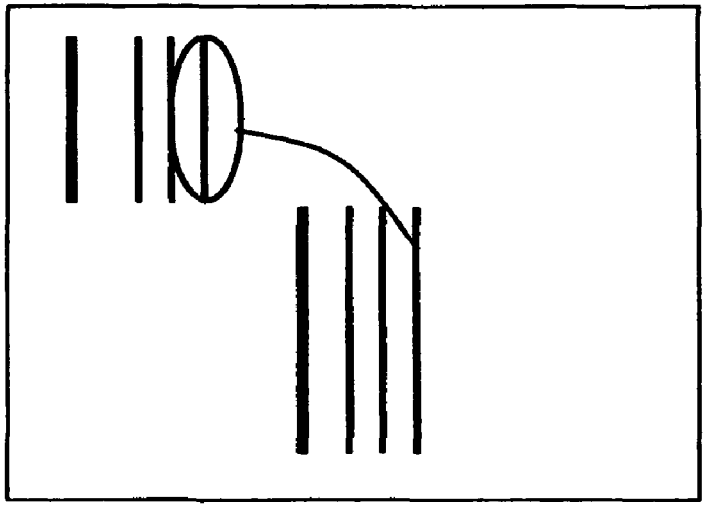
(b) ONCE POSTSCRIPT INFORMATION AND RELATED INFORMATION
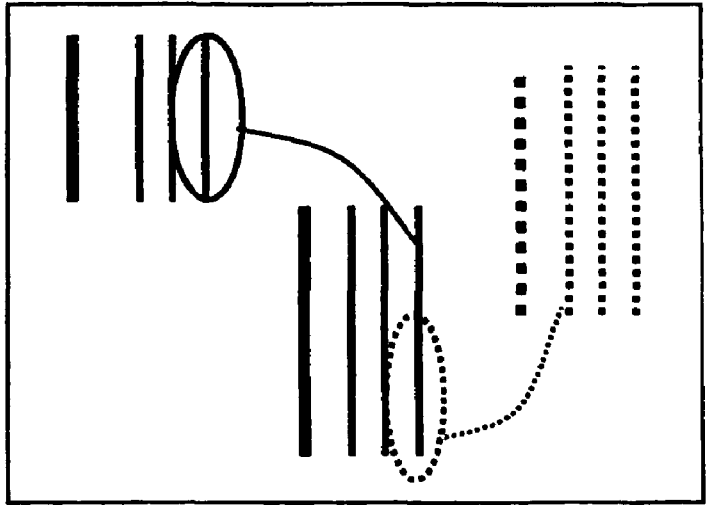
(c) TWICE POSTSCRIPT INFORMATION AND RELATED INFORMATION

IMAGE PROCESSING SYSTEM AND IMAGE PROCESSING METHOD, AND COMPUTER PROGRAM

The entire disclosure of Japanese Patent Application No. 2005-182846 including the specification, claims, drawings and abstract is incorporated herein by reference in its entirety.

BACKGROUND OF THE INVENTION

1. Field of the Invention

The invention relates to an image processing system and an image processing method, and a computer program. More particularly, the invention relates to an image processing system and an image processing method and a computer program, capable of providing postscript information as well as related information to the user, by extracting the postscript information such as a memo made in a document including texts and image data, for example, a printed document, and then analyzing a correlation between the postscript information and original information and a mutual correlation between the postscript information.

2. Description of the Related Art

In the field of image processing, various researches and developments in the process of extracting the postscript information such as a memo written by the user in a document that is output from a printer, a FAX, for example, are carried on. Normally, in such postscript extracting process, processing of comparing an output document, into which the postscript might be made, with original document data is carried out.

For example, in JP Hei. 10-255027 A, such a configuration is disclosed that an original document and a new draft document into which the postscript might be made are saved as electronic documents and then an extraction of postscript information is executed by extracting a difference between these electronic documents.

In the foregoing systems including JP Hei. 10-255027 A, the identification and extraction of the postscript information are executed. Therefore, there was no system that can analyze the correlation between postscript information and original information, for example, to which sentence of the original information the postscript information was inserted as the related information to correspond. Also, there was no system that has a configuration to analyze mutual correlations between the postscript information, and the like.

Normally, when the user makes the postscript such as a memo in any original document, in many cases such user will make the postscript as the information related to some portion of the original information that have already been written in the original document. In the case where the postscript information related to such original information was sensed, if only the postscript information is extracted and provided to the user, the user often does not understand what the postscript information means. In such case, if not only the postscript information but also the original information related to the postscript information can be provided to the user, the user can easily grasp the meaning of the postscript information.

However, most of the systems used to extract the postscript information were constructed merely to execute the extraction of the postscript information. Therefore, no system that can analyze the correlation with the original information and provide such correlation to the user was proposed.

SUMMARY OF THE INVENTION

The invention has been made in view of the above problems, and provides an image processing system and an image processing method and a computer program, which can provide inserted information together with related information to the user by extracting the inserted information such as a memo made in a document including texts and image data, for example, a printed original document, and then analyzing a correlation between the inserted information and original information and a mutual correlation between the inserted information.

According to an aspect of the invention, an image processing system includes a modified area deciding unit, a modified area correlation deciding unit, a display selecting unit and a displaying unit. The modified area deciding unit executes processing of deciding a modified area in input image data, which has a previous image and a postscript information to the previous image. The modified area contains an area, which is distinguished as the postscript information. The modified area correlation deciding unit specifies a related information area of the previous image corresponding to the modified area. The modified area correlation deciding unit executes processing of deciding a correlation between the modified area and the related information area. The display selecting unit selects a display mode of the postscript information and related information of the related information area. The display mode is set based on the correlation. The displaying unit executes processing of displaying the postscript information and the related information in response to the display mode selected by the display selecting unit.

According to another aspect of the invention, an image processing method includes: executing processing of deciding a modified area in input image data, which has an previous image and a postscript information to the previous image, the modified area containing an area, which is distinguished as the previous information; specifying a related information area of the previous image corresponding to the decided modified area; executing processing of deciding a correlation between the modified area and the related information area; selecting a display mode of the postscript information and related information of the related information area, the display mode being set based on the decided correlation; and executing processing of displaying the postscript information and the related information in response to the selected display mode.

According to still another aspect of the invention, a storage medium is readable by a computer. The storage medium stores a program of instructions executable by the computer to perform a function for data managing. The function includes: executing processing of deciding a modified area in input image data, which has an previous image and a postscript information to the previous image, the modified area containing an area, which is distinguished as the previous information; specifying a related information area of the previous image corresponding to the decided modified area; executing processing of deciding a correlation between the modified area and the related information area; selecting a display mode of the postscript information and related information of the related information area, the display mode being set based on the decided correlation; and executing processing of displaying the postscript information and the related information in response to the selected display mode.

The computer program of the invention can be provided by the storing medium or the communication medium provided to the computer system, which can execute various program codes, in a computer-readable format, or the recording medium such as CD, FD, MO, or the communication medium such as the network. The process can be realized on the computer system in response to the program, by providing such program in a computer-readable format.

Additional object, features, advantages of the invention become obvious by detailed explanations made based on the embodiments of the invention and the accompanying drawings, described later. Also, the word "system" in this specification means a logical set configuration of plural system, and is not limited to the system whose constituent devices are installed in the same enclosure.

According to the configuration set forth above, the image processing system for executing the processes of extracting and providing the postscript information is constructed to extract the modified areas in an input image data which has an previous image and an postscript information to the previous image, and the modified area contains the areas that are decided as the postscript information, determines the areas containing the related information corresponding to the modified areas, extract the areas containing the related information, and select the areas containing the postscript information and the related information of the postscript information and display such areas on the displaying unit. Therefore, the user can look at not only the postscript information but also the previous (or original) information related to the postscript information and other postscript information. Thus, the system allowing a user to grasp effectively the meaning of the postscript information and the important information can be provided.

BRIEF DESCRIPTION OF THE DRAWINGS

FIG. 9 is a view explaining an example of a data configuration of a correlation history information table held by a correlation history holding unit in the image processing system according to one embodiment of the invention.

FIG. 12 is a view explaining an example of a display data configuration output from the image processing system according to one embodiment of the invention.

DETAILED DESCRIPTION OF EMBODIMENTS OF THE INVENTION

Details of an image processing system and an image processing method and a computer program according to embodiments of the invention will be explained with reference to the drawings, hereinafter.

Figure 1:
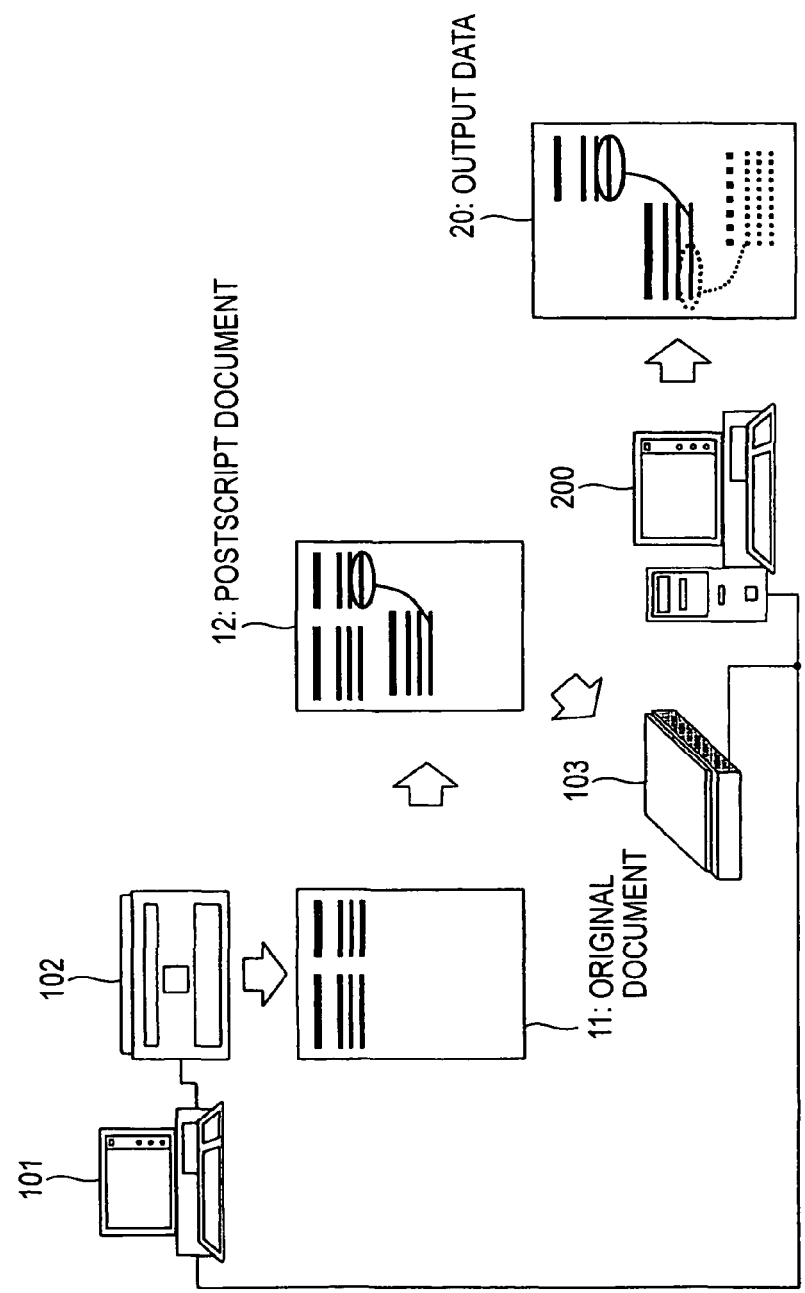
FIG. 1 is a view explaining an outline of processing to which an image processing system according to one embodiment of the invention is applied.

First, an outline of a process to which an image processing system according to an embodiment of the invention is applied will be explained with reference to FIG. 1. An original document 11 shown in FIG. 1 is a document such as a paper medium onto which electronic data stored in an information processing system 101 such as PC are output via a printer 102. This original document 11 is read by a data reading/processing device such as a scanner and stored in a storing portion of the information processing system 101 as electronic data. The read data may be any of image data, text data and the like. For example, such read data may be captured by OCR, for example, as data whose texts have already been analyzed. In the invention, documents to be processed may be either of the image data and the text data.

In this case, not only the document read by the data reading device such as the scanner but also the document prepared as the electronic data generated by the information processing system 101 such as PC and stored in a database such as a hard disk may be used as the original document. For example, the original document 11 may be a document, which is generated by a document forming application and to which various attribute data such as layout information are given.

The document data stored in the database such as the hard disk of the information processing system 101 are output via the printer 102 as the original document 11 and then distributed to the user. The output document output from the printer is the original document 11 shown in FIG. 1.

The user makes a memo in the original document 11. The user makes the so-called postscript. As a result, an postscript document 12 shown in FIG. 1 is generated. The postscript document 12 is read by utilizing a scanner 103, for example, and read data are stored in an image processing system 200.

The image processing system 200 acquires data of the postscript document 12 via the scanner 103 and data of the original document 11 from the information processing system 101 via the network. The image processing system 200 executes processing of comparing the data of the original document 11 and that of the postscript document 12 and processing of extracting a difference between them. The image processing system 200 generates output data 20, and then provides the analyzed result via the display or outputs the analyzed result via the printer (not shown). In case the original document data cannot be acquired, the postscript information are extracted only from the postscript document. These processes will be described later.

The image processing system 200 according to this embodiment of the invention can not only apply a difference analysis to the original document 11 and the postscript document 12 to extract the postscript information, but also analyze a correlation between the postscript information and the original information and a correlation between the mutual postscript information to provide the postscript information as well as related information.

A specific example of processing executed by the image processing system 200 according to this embodiment of the invention will be explained with reference to FIG. 2.

Figure 2:
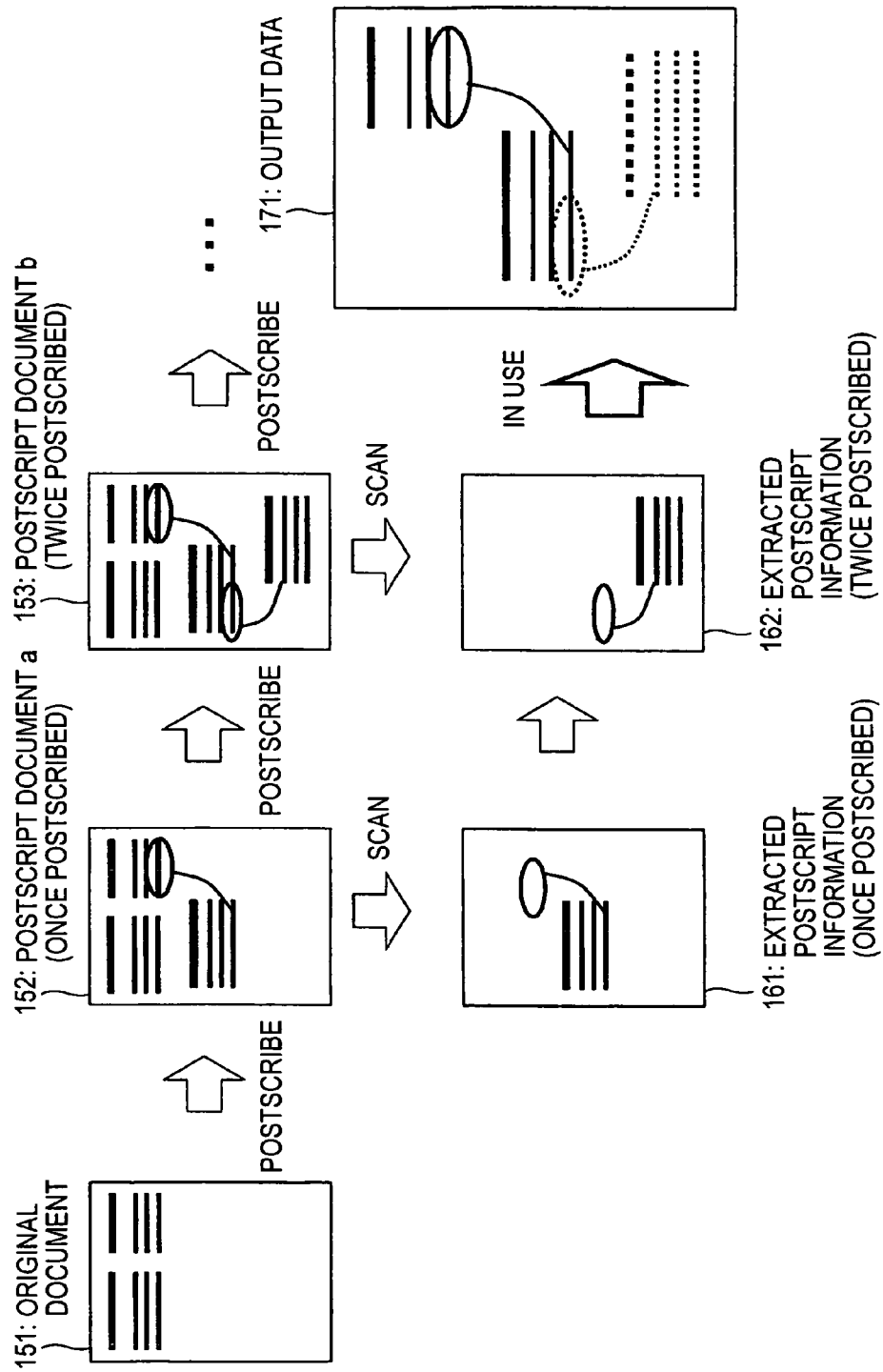
FIG. 2 is a view explaining the outline of the processing, to which the image processing system according to one embodiment of the invention is applied, and a document.

An original document 151 in which no postscript is made, an postscript document a 152, and an postscript document b 153 are shown in an upper stage in FIG. 2. The postscript document a 152 contains postscript information such as a memo written by a user who received the original document 151. The postscript document b 153 shows postscript document in which new postscript information are further added to the postscript document a 152.

In FIG. 2, these documents are shown as the postscript document a (once postscribed) 152, and
the postscript document b (twice postscribed) 153.

Also, an postscript document (three times postscribed), . . . , may be provided.

The original document 151 is saved in the image processing system 200 as electronic data. Also, the postscript document a (once postscribed) 152 and the postscript document b (twice postscribed) 153 are saved in the image processing system 200 as the electronic data (e.g., image data of the scanned image) by a scanning process using the scanner, for example.

The image processing system 200 executes extracting the postscript information based on these plural pieces of data. An extracted postscript information 161 shown in FIG. 2 is generated based on difference information between the original document 151 and the postscript document a 152. Also, an extracted postscript information 162 is generated as data from which the data contained in the extracted postscript information 161 are removed based on difference information between the original document 151 and the postscript document b 153. Also, the extracted postscript information 162 can be generated based on difference information between the postscript document a 152 and the postscript document b 153. Here, past document, which is a target of the difference extraction cannot be acquired, the postscript information may be extracted from the document, which is a target of the postscript extraction only. These processes will be explained later.

The image processing system 200 according to this embodiment of the invention analyzes the correlation between the postscript information and original information and the mutual correlation between the postscript information, and outputs output data 171. The output data 171 are output to the display or the printer as output data of the postscript information and original information data selected as the original information related to the postscript information, for example. The user can check not only the postscript information but also the original information related to the postscript information, and thus can grasp easily what the postscript information means.

Figure 3:
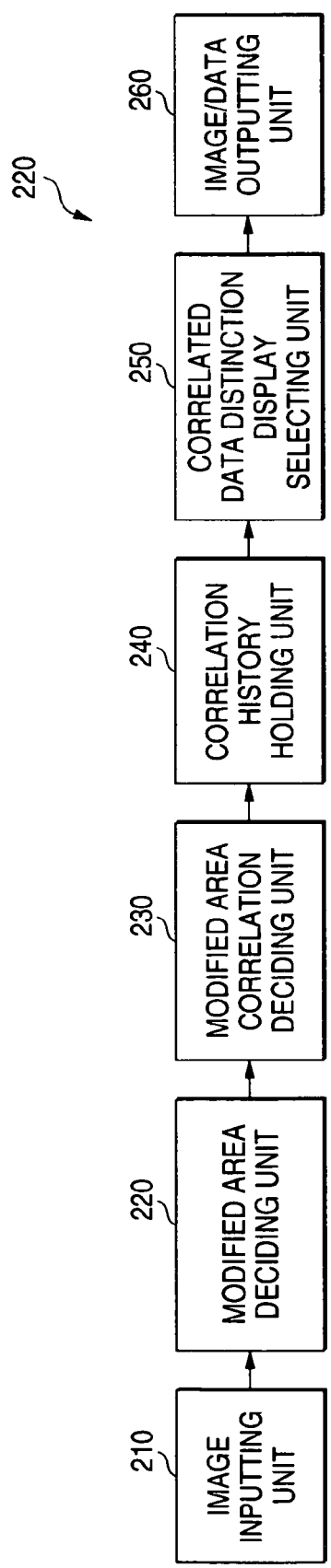
FIG. 3 is a view explaining a configuration of the image processing system according to one embodiment of the invention.

Next, a configuration and processing of the image processing system 200 according to this embodiment of the invention will be explained with reference to FIG. 3 et seq. hereunder. FIG. 3 is a block diagram showing a configuration of the image processing system 200 according to this embodiment of the invention. The image processing system 200 includes an image inputting unit 210, a modified area deciding unit 220, a modified area correlation deciding unit 230, a correlation history holding unit 240, a correlated data distinction display selecting unit 250, and an image/data outputting unit 260.

The image inputting unit 210 inputs image data as the analysis target, for example, the postscript document or both the original document and the postscript document. These data are input from the scanner, the database such as the hard disk. In this case, various data such as the document containing image data, text data, attribute data such as layout information, etc. are contained in the input document.

The document data being input into the image inputting unit 210 are input into the modified area deciding unit 220. The modified area deciding unit 220 selects the image data required to extract the postscript information, and executes processing of acquiring the postscript information.

Figure 4:
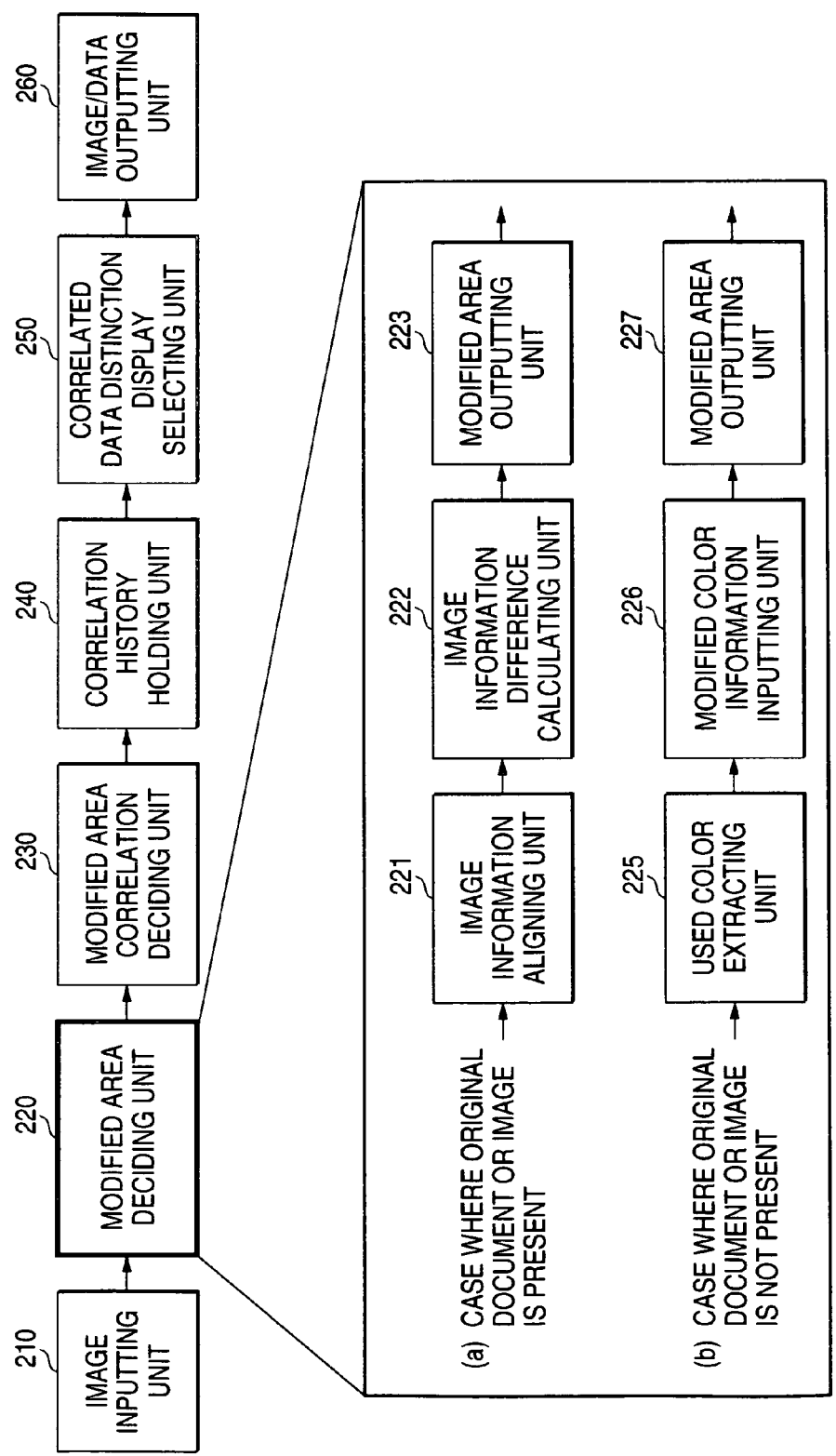
FIG. 4 is a view explaining a detailed configuration of a modified area deciding unit in the image processing system according to one embodiment of the invention.

A detailed configuration of the modified area deciding unit 220 will be explained with reference to FIG. 4 hereunder. As shown in FIG. 4, the modified area deciding unit 220 has a different processing configuration respectively in (a) the case where the original document or image is present, and (b) the case where the original document or image is not present.

First, (a) the case where the original document or image is present will be explained. When the original document or image is present, the postscript information extraction is executed by the difference extraction between two images of the original document image and the postscript document image.

First, in an image information aligning unit 221, processing of aligning two images of the original document image and the postscript document image is executed. As the approach of aligning two images, various existing approaches can be applied. The alignment is executed basically by extracting resemble feature areas from respective images, and then correlating the resemble feature areas mutually. An amount of displacement between two images is calculated based on corresponding feature areas, and then the alignment is executed based on the amount of displacement, while correcting the image data.

An image information difference calculating unit 222 executes processing of extracting a difference between the original document image data and the postscript document image data, which are aligned with each other. Like processing executed in the prior art, this processing senses whether or not a difference between a coordinate position (x, y) of the original document image data and a corresponding coordinate position (x, y) of the postscript document image data is present, for example, and then extracts data using this difference, as the postscript information only when the difference is present.

A modified area outputting unit 223 selects an area in which the postscript information extracted by the image information difference calculating unit 222 is contained and outputs this area. This area extraction such as extracting pixels containing the difference information and extracting a rectangle area containing the difference pixels is executed in compliance with a predetermined area selecting algorithm. The area data containing the extracted difference image are output to the modified area relation deciding unit 230.

Then, processing of the modified area deciding unit 220 taken in (b) the case where the original document or image is not present will be explained hereunder. When the original document or image is not present, the difference between two images of the original document image and the postscript document image cannot be extracted. Therefore, processing of extracting the data, which will be decided as the postscript information, from the postscript document only is carried out. Here, assume that the postscript document is recorded in color different from a recording color of the original document. The postscript document is extracted by a color decision. More particularly, in case the original document is monochromatic printed data and the postscript information contained in the postscript document is in red color, for example, the extraction of the postscript information is executed by extracting red-color data from the postscript document.

First, a used color extracting unit 225 extracts a color used in the postscript document by executing the image analysis (color analysis) of the postscript document. For example, the analyzed result such as black and red can be obtained.

Then, a modified color information inputting unit 226 inputs the color information that is to be identified as the postscript document. For example, the color information (red) is input by the operator. In this case, it may be set that the color information except the black is decided as the postscript information, for example, without the operator's input of the color information. In the case of this configuration, the input of the color information from the outside is not needed.

A modified area outputting unit 227 extracts pixels having the designated color from the postscript document based on the result of the image analysis (color analysis) of the postscript document executed by the used color extracting unit 225 and the color information input by the modified color information inputting unit 226 or already-set color information. Alternately, the rectangular area containing the pixels in designated color may be extracted. The modified area outputting unit 227 executes the modified area extraction in compliance with a predetermined area selecting algorithm. The extracted area data are output to the modified area correlation deciding unit 230.

Figure 5:
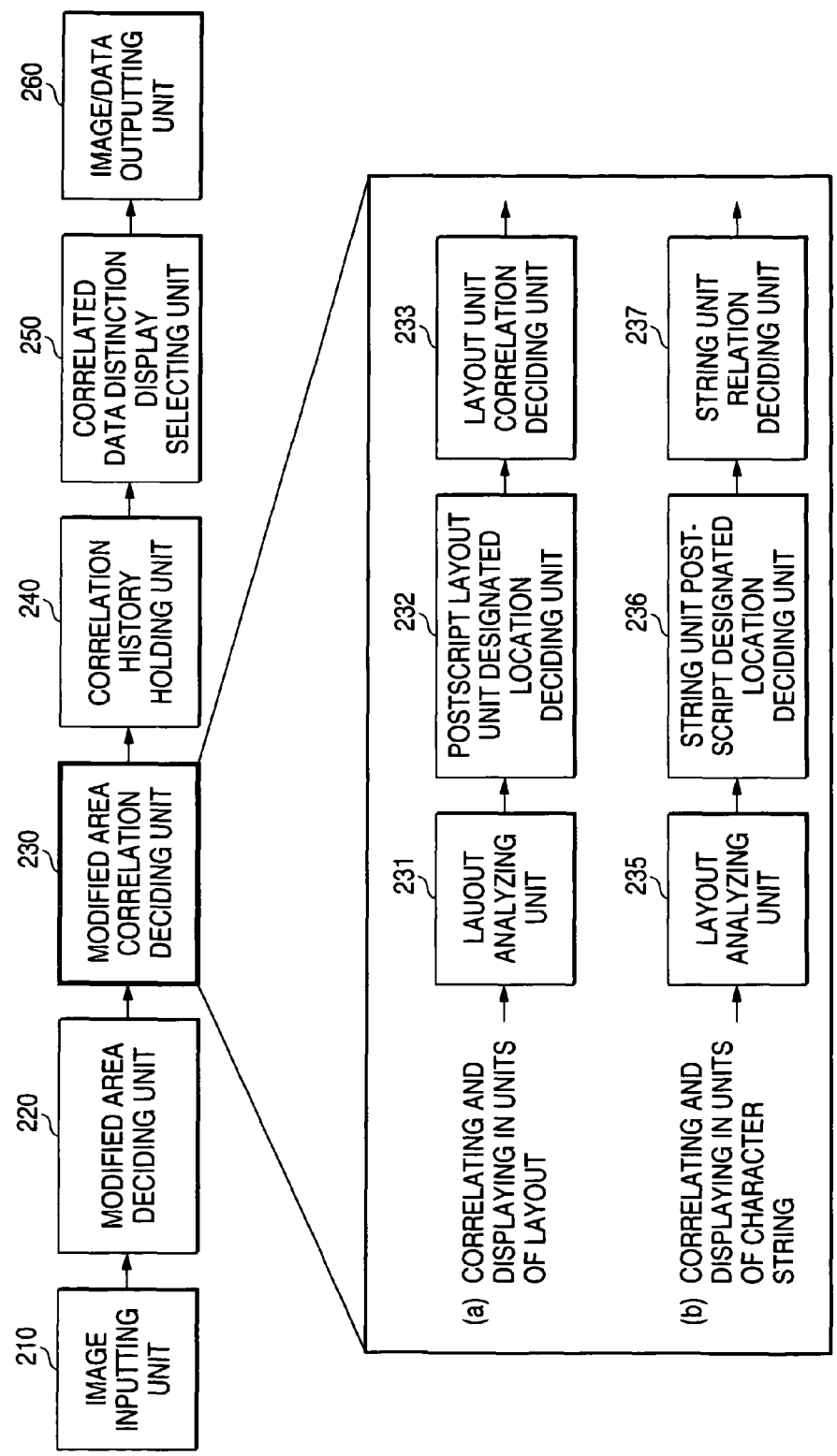
FIG. 5 is a view explaining a detailed configuration of a modified area correlation deciding unit in the image processing system according to one embodiment of the invention.

Next, a process in the modified area correlation deciding unit 230 will be explained with reference to FIG. 5 hereunder. As shown in FIG. 5, the modified area correlation deciding unit 230 has a different processing configuration respectively in (a) the case where correlating and displaying are executed in units of section of the layout, and (b) the case where the correlating and displaying are executed in units of a character string.

First, a processing configuration taken in (a) the case where correlating and displaying are executed in the units of the section will be explained hereunder. A layout analyzing unit 231 receives the image data of the original document or that of the postscript document, and executes the layout analysis of the received document. Here, when the layout information is contained in the original document as the attribute information, such information may be applied. When the layout information is not contained, the layout analysis is executed based on the image data of the original document or that of the postscript document. In this case, the layout analysis executed in the layout analyzing unit 231 is an section analysis of a character section and that of a photograph section and the purpose is mainly to decide blank positions and non-blank positions.

Figure 6:
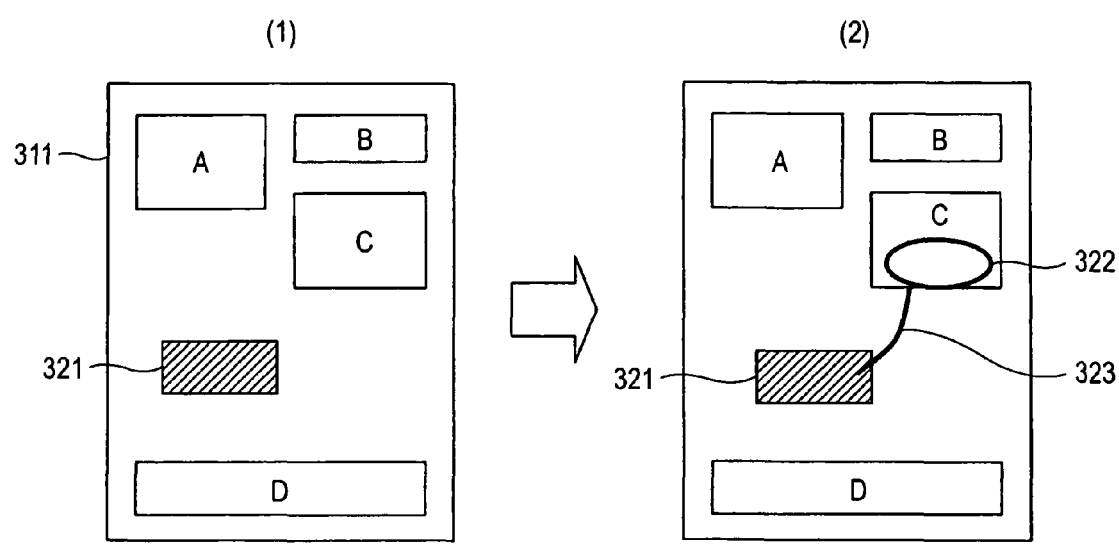
FIG. 6 is a view explaining an example processed by the modified area correlation deciding unit in the image processing system according to one embodiment of the invention.

For example, as shown in document data 311 in FIG. 6(1), areas such as the character section and the photograph section contained in the document are analyzed. Then, for example, as shown in FIG. 6(1), layout units, that is sections of the layout, A to D including the character section and the photograph section are analyzed and extracted. Here, the document data 311 shown in FIG. 6(1) is the postscript document data, and an postscript information recording area 321 is contained therein.

A postscript layout unit designated location deciding unit 232 decides whether or not designated information of the postscript information are contained in the section that is analyzed by the layout analyzing unit 231. For example, as shown in FIG. 6(2), when an ellipse 322 is contained in the layout unit C as the postscript information, this is sensed as the designated information of the postscript information. Then, it is decided that the designated information of the postscript information is contained in the layout unit C.

Then, a layout unit based correlation deciding unit 233 decides correlation in the layout units. For example, as shown in FIG. 6(2), the layout unit C containing the ellipse 322 as the designated information of the postscript information and postscript information 321 are connected by a connecting line 323, which is the postscript designated information. When such postscript designated information (a part of the postscript information) is present, it is decided that the postscript information 321 and the layout unit C has the correlation therebetween.

Figure 7:
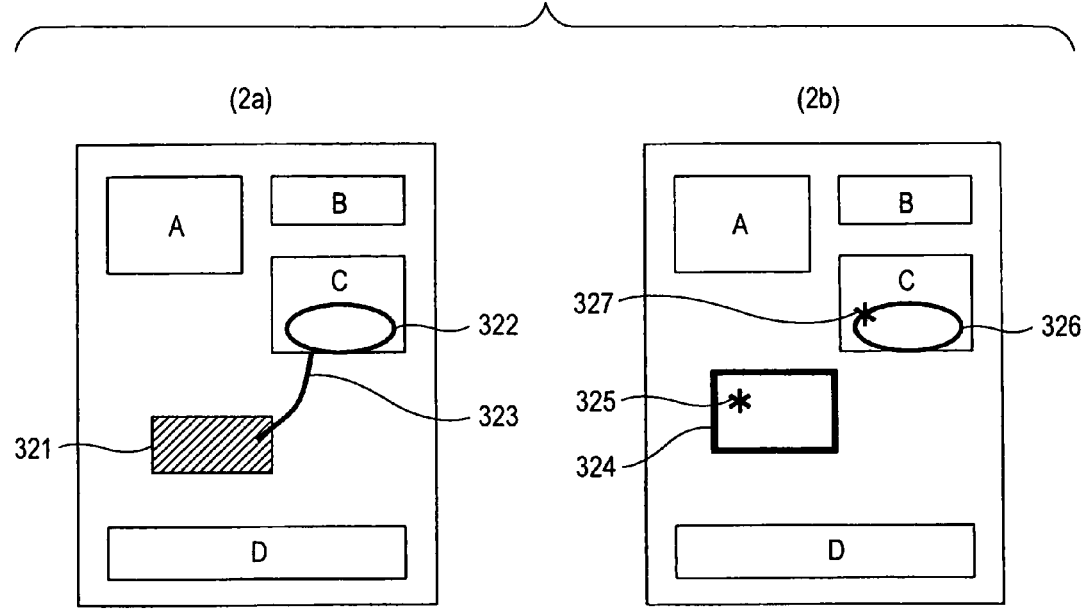
FIG. 7 is a view explaining an example processed by the modified area correlation deciding unit in the image processing system according to one embodiment of the invention.

As a mode of the correlation deciding process, not only such connecting line but also other postscript designated information may be applied. A mode of the correlation deciding process will be explained with reference to FIG. 7 hereunder. FIG. 7(2a) shows such a relation that the postscript information 321 and the layout unit C are connected by a connecting line 323. FIG. 7(2b) shows the case where an identifier 325, which is the postscript designated information, recorded in postscript information 324 and an identifier 327, which is the postscript designated information, recorded in the layout unit C, which contains an ellipse 326, which is the postscript designated information, are identical or similar to each other. In this manner, when the identical or similar identifier is recorded in the postscript information and the layout unit, these identifiers are also decided as the postscript designated information, and thus it is decided that the postscript information 324 and the layout unit C has the correlation therebetween.

In this case, the example shown in FIG. 7 shows the case where there is the correlation between one postscript information and one layout unit (or one section of the layout of the page of the document). In the case where there is the correlation between plural pieces of postscript information and a plurality of layout units, it is possible similarly to decide the correlation. Also, the correlation between mutual postscript information and the correlation between mutual layout units can be decided. In this manner, the layout unit correlation deciding unit 233 can decide the correlation between the postscript information and the layout unit, the correlation between pieces of the postscript information and the correlation between the layout units.

Next, a process configuration applied in (b) the case where correlating and displaying are executed in the units of a character string will be explained hereunder. Like the layout analyzing unit 231, a layout analyzing unit 235 shown in FIG. 5 receives the image data of the original document or that of the postscript document, and applies the layout analysis to the received document. Here, when the layout information is contained as the attribute information in the original document, such information may be applied. When the layout information is not contained, the layout analysis is executed based on the image data of the original document or the postscript document.

Figure 8:
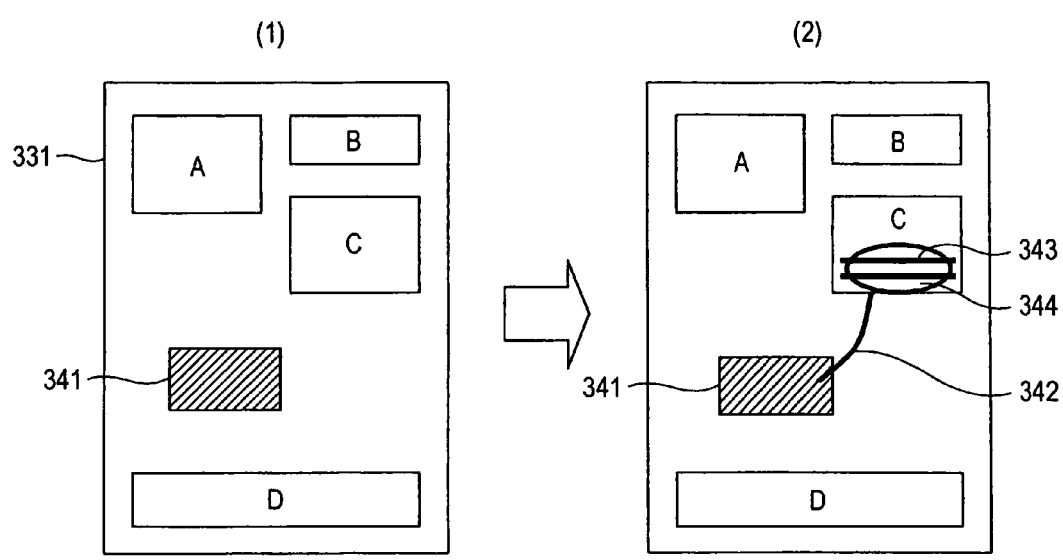
FIG. 8 is a view explaining an example processed by the modified area correlation deciding unit in the image processing system according to one embodiment of the invention.

For example, as shown in a document data 331 in FIG. 8(1), areas such as the character areas and the photograph areas are contained in the document are analyzed. For example, as shown in FIG. 8(1), the layout units A to D including the character area and the photograph area are analyzed and extracted. In this case, the document data 331 shown in FIG. 8(1) is the postscript document data, and a recording area of postscript information 341 is contained therein.

A string unit postscript designated location deciding unit 236 decides whether or not designated information of the postscript information is contained in the character string unit. For example, as shown in FIG. 8(2), when an ellipse 343, which is the postscript designated information, is set in a character string 344, this is sensed as the designated information of the postscript information, and then it is decided that the designated information of the postscript information is contained in the character string 344 unit.

Then, a string unit correlation deciding unit 237 decides the correlation in the character string unit. For example, as shown in FIG. 8(2), the character string 344 in which the ellipse 343, which is the postscript designated information, is set and the postscript information 341 are connected by a connecting line 342, which is the postscript designated information. When the postscript designated information like such connecting line is present, it is decided that the postscript information 341 and the character string 344 has the correlation therebetween.

Like the correlation deciding process in the layout unit explained above with reference to FIG. 7, a mode of the correlation deciding process in the character string unit may be applied based on not only such connecting line but also other information, for example, the similar identifier. In the correlation decision in the character string unit, the correlation between plural pieces of postscript information and a plurality of character string units can be also decided. Also, the correlation between pieces of postscript information and the correlation between mutual character string units can be decided. In this manner, the string unit correlation deciding unit 237 can decide the correlation between the postscript information and the character string unit, the correlation between pieces of the postscript information and the correlation between the character string units.

As described above, the modified area correlation deciding unit 230 decides mutual correlations among the postscript information, the layout unit, and the character string unit in the units of layout or in the units of the character string, based on the postscript information. The correlation information are held by the correlation history holding unit 240 as history data.

As explained previously with reference to FIG. 2, plural postscript documents can be generated from the original document. These postscript documents are read by the scanner as the image data, respectively. Then, the image data corresponding to plural postscript documents are stored in the storing portion of the image processing system, like postscript document a (once postscribed)
postscript document b (twice postscribed)
postscript document c (three times postscript)
. . .

Then, the extracting the postscript information from respective postscript documents and the acquiring the correlation information based on the correlation decision are executed.

The modified area correlation deciding unit 230 executes the acquiring the correlation information based on the postscript information that are extracted based on respective postscript documents, like (a) acquiring the correlation information based on the postscript information in the postscript document a (once post scribed)

(b) acquiring the correlation information based on the postscript information in the postscript document b (twice postscribed)

(c) acquiring the correlation information based on the postscript information in the postscript document c (thrice postscript)
. . .

The relation history holding unit 240 holds these correlation information in the storing portion as the history data.

As described above, the processing of extracting the postscript information based on respective postscript documents can be carried out as either processing of acquiring the postscript information from the original information or processing of acquiring the postscript information from the preceding postscript document. When the process of acquiring the postscript information from the original information is executed in the postscript document (n-th postscribed), all the postscript information are extracted in plural-times preceding postscript documents. In this event, if the postscript information that have already been extracted in the preceding postscript document (n-1-th postscript) are removed from these extracted postscript information, only the postscript document that is newly postscript in the postscript document (n-th postscribed) can be extracted.

An example of a correlation history information storing table that a relation history holding unit 240 holds is shown in FIG. 9. The correlation history information storing table shown in FIG. 9 gives an example of the table in which the correlation information acquired by the correlation deciding process in the layout unit are stored. The layouts A to D are contained in the original document. The postscript information obtained by the processing of extracting the postscript based on the postscript document (once postscribed) are indicated as an postscript P1, an postscript P2, and an postscript P3. It is decided by the processing of deciding correlation based on the postscript document (once postscribed) that the information in the layout C contained in the original and the postscript P1 have the correlation therebetween, and the decision result has been input thereto.

Figure 10:
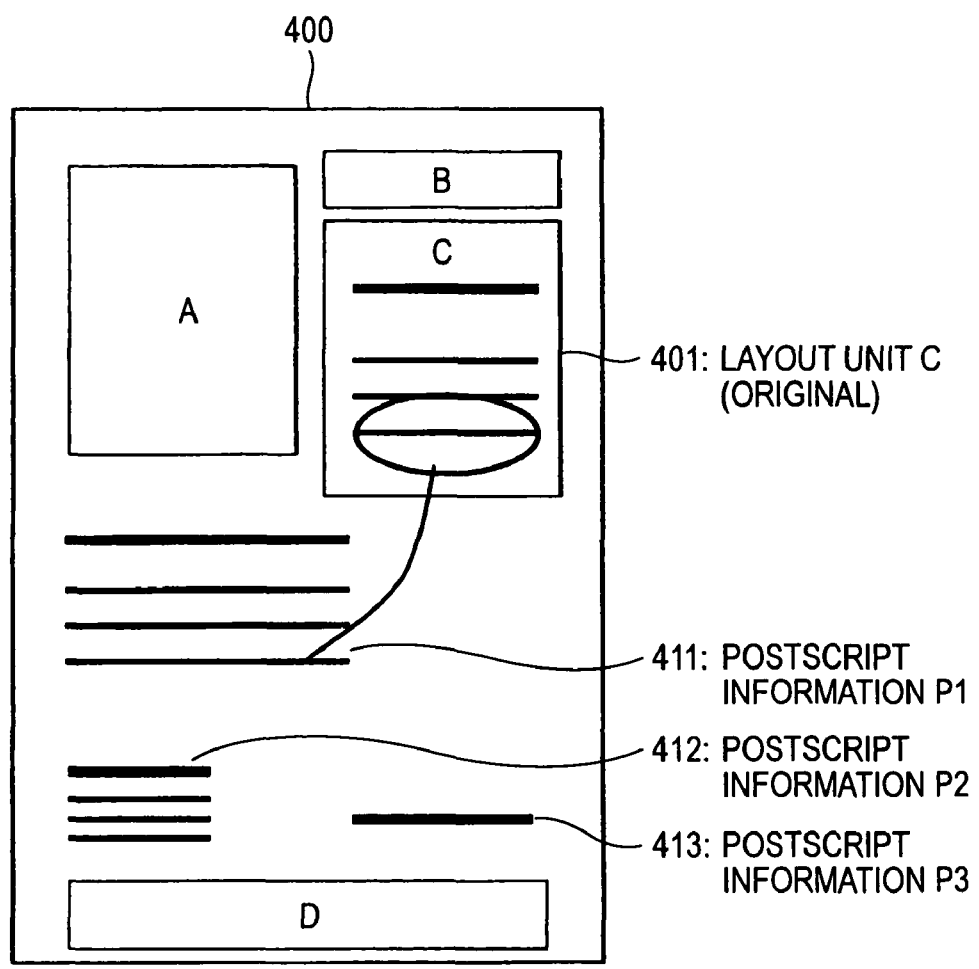
FIG. 10 is a view explaining an example of a data configuration of an inserted document, which is a processed object of the image processing system according to one embodiment of the invention.

An example of the postscript document (once postscribed) from which the data shown in the table in FIG. 9 are extracted is shown in FIG. 10. As shown in FIG. 10, an postscript document 400 includes postscript information P1 411, postscript information P2 412, and postscript information P3 413 while the original document that has layout units A to D. Also, the postscript information P1 411 and a layout unit C 401 are connected by a connecting line and thus it is decided that they have the correlation therebetween. As a result, the decision results indicating that the postscript information obtained by the processing of extracting the postscript based on the postscript document (once postscribed) are the postscript P1, the postscript P2, and the postscript P3 and that the layout C contained in the original and the postscript P1 have the correlation therebetween are stored in respective columns of the postscript document (once postscribed) in the correlation history information table shown in FIG. 9.

Also, the postscript information of the postscript document (twice postscribed) and the postscript document (thrice postscript), . . . and the correlation information of the postscript document (twice postscribed) and the postscript document (thrice postscript), . . . are stored. Thus, the correlation history information table shown in FIG. 9 is stored/held in the relation history holding unit 240 functioning as the storing portion.

The correlated data distinction display selecting unit 250 sets a display mode in which pieces of data that are decided to have the correlation therebetween are displayed distinctively. Various display modes such as "only the once postscribed document and its related information are extracted and displayed", "only the twice postscribed document and its related information are extracted and displayed", "all postscript document and their related information are extracted and displayed", and others, for example, can be selected. This selecting processing can be decided by the user's input. For example, "all postscript document and their related information are extracted and displayed" is set in the default setting. The user can change such setting into "only the once postscribed document and its related information are extracted and displayed" via the inputting unit. In the case of "all postscript document and their related information are extracted and displayed", when the once-postscript information and the twice-postscript information are displayed in a different display mode, e.g., when these information are displayed in different display color, these display modes can be displayed in accordance with default setting information that are set in advance in the system. Also, the user can set the display mode via the inputting unit.

The image/data outputting unit 260 displays the display information selected in the correlated data distinction display selecting unit 250 in compliance with a predetermined display mode or a display mode set manually.

Figure 11:
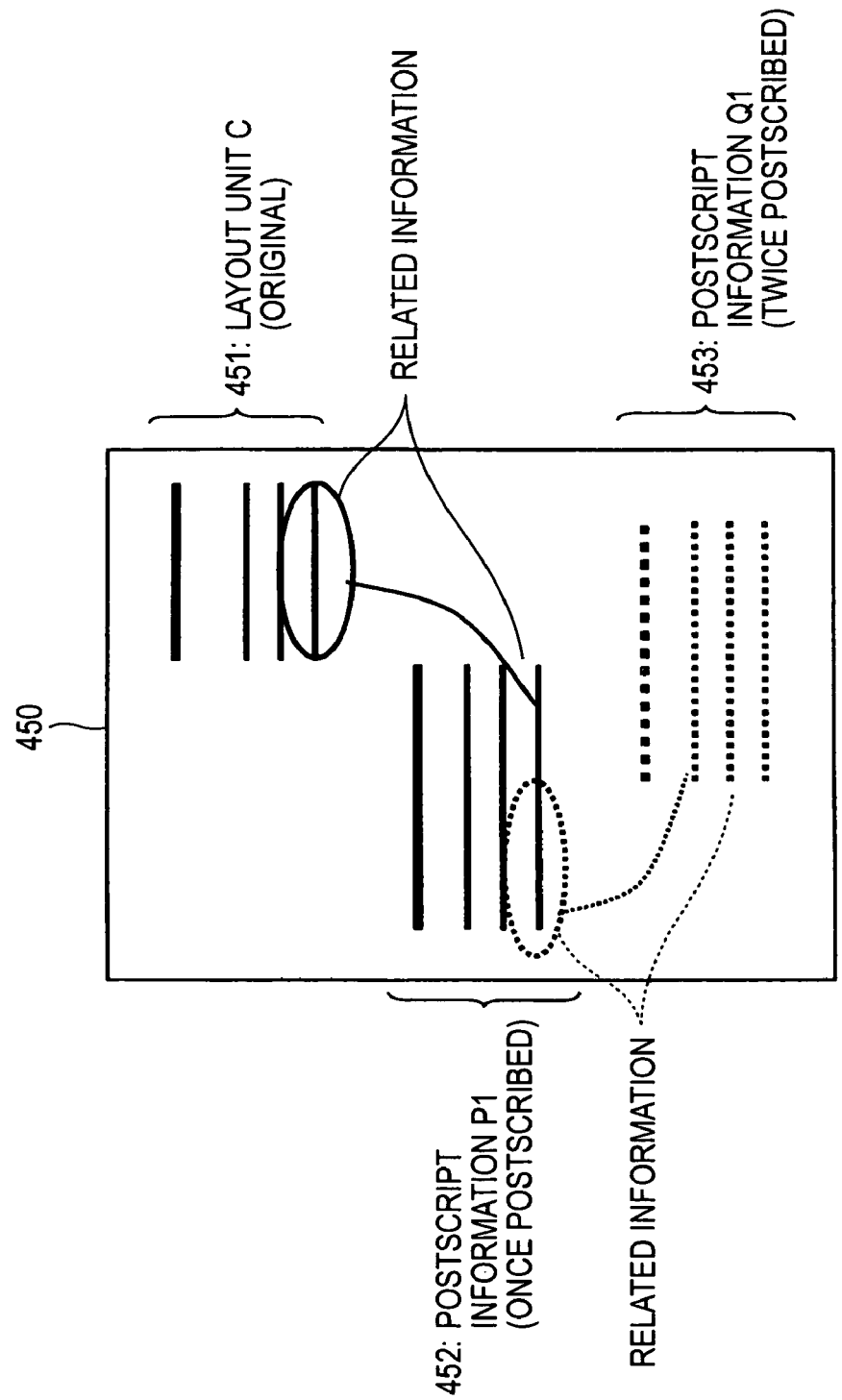
FIG. 11 is a view explaining an example of a display data configuration output from the image processing system according to one embodiment of the invention.

An example of the display data is shown in FIG. 11. The display data shown in FIG. 11 gives an example of a display data 450 in which the display mode of the once postscribed information and that of the twice postscribed information are different from each other. In the display data 450 shown in FIG. 11, once postscribed information P1 452 and twice postscribed information Q1 453 are selected and displayed. These data are distinguished by a solid line and a dotted line in FIG. 11, which shows that these data are displayed in different display modes in red and blue colors, for example.

In addition, layout unit C data 451, which is the original information and decided as the related information to the once postscribed information P1 452, as well as a connecting line connected to the once postscribed information P1 452 is displayed. The modified area correlation deciding unit 230 decides that the layout information unit C data 451 and the once postscribed information P1 452 have the correlation therebetween. Also, the layout information unit C data 451 and the once postscribed information P1 452 are registered in the correlation history information table held by the correlation history holding unit 240 such that these information have the correlation therebetween. The layout unit C data 451 is displayed as the related information of the postscript information P1 452. Also, because the postscript information P1 452 is the related information of the postscript information Q1 453, the postscript information P1 452 is displayed by the processing of displaying related information applied to the postscript information Q1 453, as well. The image/data outputting unit 260 executes the displaying process based on the registered data in the correlation history information table held by the correlation history holding unit 240.

In this case, the display data may be constructed by the hypertext and the related data may be correlated with the hyperlinks. For example, in the image/data outputting unit 260, the image and the text are classified based on the layout information, the character string information of the scan image, and the related information. Then, the hyperlinks are set between pieces of the related data, and the display data are generated as the hypertexts and displayed.

In this case, as described previously in the explanation about the correlated data distinction display selecting unit 250, the display data can be displayed while selecting various display modes such as "only the once postscribed document and its related information are extracted and displayed", "only the twice postscribed document and its related information are extracted and displayed", "all postscript document and their related information are extracted and displayed", and others.

A plurality of display examples are shown in FIG. 12. In FIG. 12, three types of display examples, i.e., (a) total postscript information and their related information (b) the once-postscript information and its related information (c) the twice-postscript information and its related information.

In the display of (a) total postscript information and their related information, these information can be displayed while distinguishing the display mode such as a display color in response to the number of postscripts.

Next, a process sequence executed by the image processing system according to this embodiment of the invention will be explained with reference to flowcharts shown in FIG. 13 at seq. hereunder. In a process flow in FIG. 13, steps S102 to S104 correspond to the processing executed in the modified area deciding unit 220. Specifically, steps S102 to S104 correspond to the process flow executed in the modified area deciding unit 220

(a) the case where the original document or image is present

, which is explained with reference to FIG. 4.

In step S101, the scan image is input. This is the process executed in the image inputting unit 210. The image data, which is an analysis target, for example, the postscript document, or the original document and the postscript document are input. In this case, the inputting unit is not limited to the scanner, and these data may be input from the database such as the hard disk.

Steps S102 to S104 are the process executed in the modified area deciding unit 220. Here, the modified area deciding unit 220 executes the process in (a) the case where the original document or image is present, which is explained with reference to FIG. 4. First, in step S102, the scan image (postscript document) is aligned with the original image. In step S103, difference information between the scan image and the original image is calculated. Instep S104, pixels in which the difference information is present or areas containing the pixels are decided as the modified area.

A step S105 is the processing executed in the modified area correlation deciding unit 230. As explained above with reference to FIG. 5, the modified area correlation deciding unit 230 executes the different process respectively in (a) the case where correlating and displaying are executed in the units of layout, and (b) the case where correlating and displaying are executed in the units of a character string.

Figure 14:
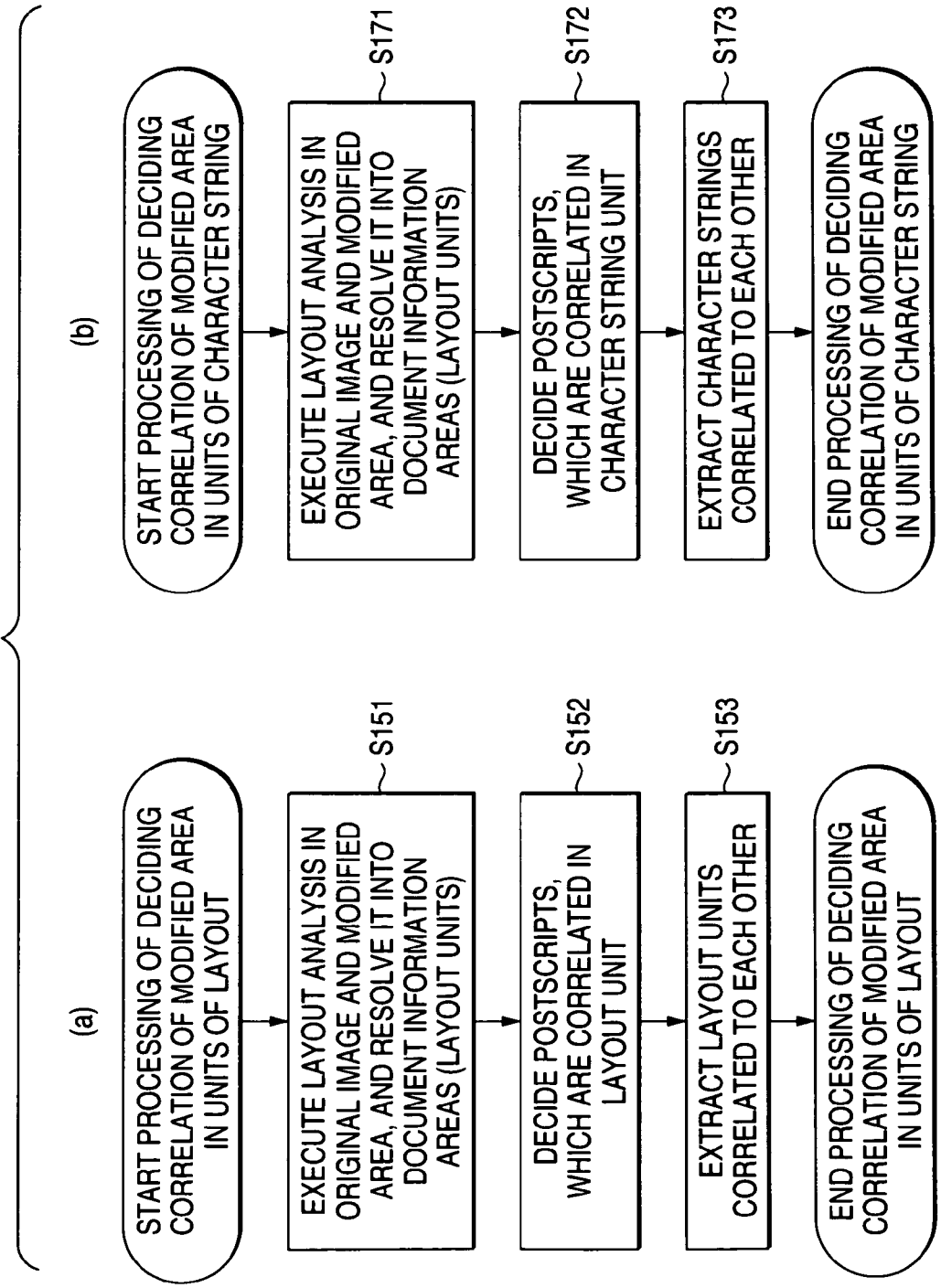
FIG. 14 is a flowchart explaining a process sequence executed by the image processing system according to one embodiment of the invention.

These process sequences will be explained with reference to a flowchart shown in FIG. 14 hereunder. FIG. 14(a) shows a process sequence of the modified area correlation deciding unit 230 when the correlation and the display are executed in the layout unit.

First, in step S151, the layout analysis of the document is executed. In this case, when the layout information is contained in the original document as the attribute information, such information may be applied. When the layout information is not contained, the layout analysis is executed based on the image data of the original document or that of the postscript document.

Then, in step S152, it is decided whether or not the designated information of the postscript information are contained in respective analyzed layout units. For example, as shown in FIG. 6(2), when the ellipse 322 is contained in the layout unit C as the postscript information, this is sensed as the designated information of the postscript information. Thus, it is decided that the designated information of the postscript information is contained in the layout unit C.

Then, in step S153, the correlation of the layout unit is decided. For example, as shown in FIG. 6(2), the layout unit C containing the ellipse 322 as the postscript information and the postscript information 321 are connected by the connecting line 323, which is the postscript designated information. When such connecting information (postscript designated information) is present, it is decided that the postscript information 321 and the layout C have the correlation therebetween. Here, as described above, not only such connecting line but also an identifier such as a mark contained in the postscript information and the layout unit may be applied in the mode of the correlation deciding process.

Next, a process sequence of the modified area correlation deciding unit 230 executed when correlating and displaying are executed in the units of a character string in FIG. 14(b) will be explained hereunder.

In step S171 which is the similar process in step S151, the layout analysis of the document is executed. Then, in step S172, it is decided whether or not the designated information of the postscript information are contained in the character string unit being contained in respective analyzed layouts. For example, as shown in FIG. 8(2), when the ellipse 344, which is the postscript information, is recorded in the character string unit, this is sensed as the designated information of the postscript information. Thus, it is decided that the designated information of the postscript information are contained in the character string unit 343.

Then, in step S173, the correlation of the character string unit is decided. For example, as shown in FIG. 8(2), the character string unit 343 containing the ellipse 343 as the postscript information and the postscript information 341 are connected by the connecting line 342, which is the postscript designated information. When such connecting information (postscript designated information) is present, it is decided that the postscript information 341 and the character string unit 343 have the correlation therebetween. Here, as described above, not only such connecting line but also an identifier such as a mark contained in the postscript information and the layout unit may be applied in the mode of the correlation deciding process.

Figure 13:
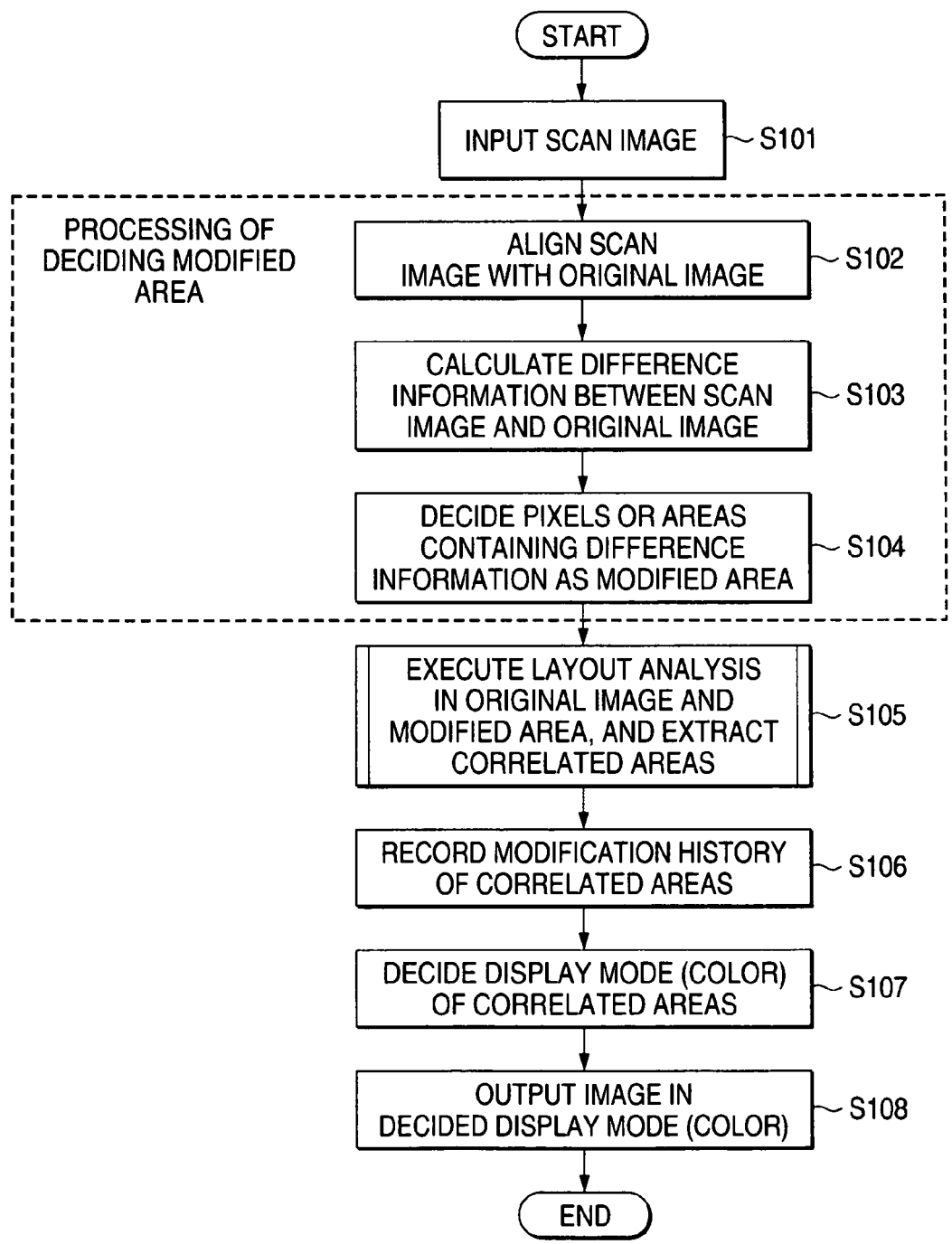
FIG. 13 is a flowchart explaining a process sequence executed by the image processing system according to one embodiment of the invention.

When the above processing of deciding the correlation of the modified area is ended, the process goes to step S106 in a flowchart in FIG. 13. This step S106 is the processing executed in the correlation history holding unit 240. For example, the correlation history information table explained above with reference to FIG. 9 is generated or updated and then stored in the storing portion. The postscript information of respective inserted documents and the related information extracted based on the postscript information are contained in the correlation history information table. The related information contain:

the correlation between the postscript information and the layout unit (or the character string unit), the correlation between pieces of the postscript information, the correlation between the layout units (or the character string units), and the like.

In step S107, the display mode of the information is selected. This is the processing executed in the correlated data distinction display selecting unit 250. The processing of selecting the display data and the processing of deciding the display mode (e.g., color) of the information are executed.

Then, in step S108, the processing executed in the image/data outputting unit 260 is executed, and various data are displayed in compliance with the information display mode decided in step S107. For example, the displaying explained with reference to FIG. 11 or FIG. 12 is executed. That is, as shown in FIG. 12, various displays such as (a) total postscript information and their related information (b) the once-postscript information and its related information (c) the twice-postscript information and its related information, and others.

Since the user can view not only the postscript information but also the original information related to the postscript information and other postscript information, such user can grasp easily what the postscript information means.

Figure 15:
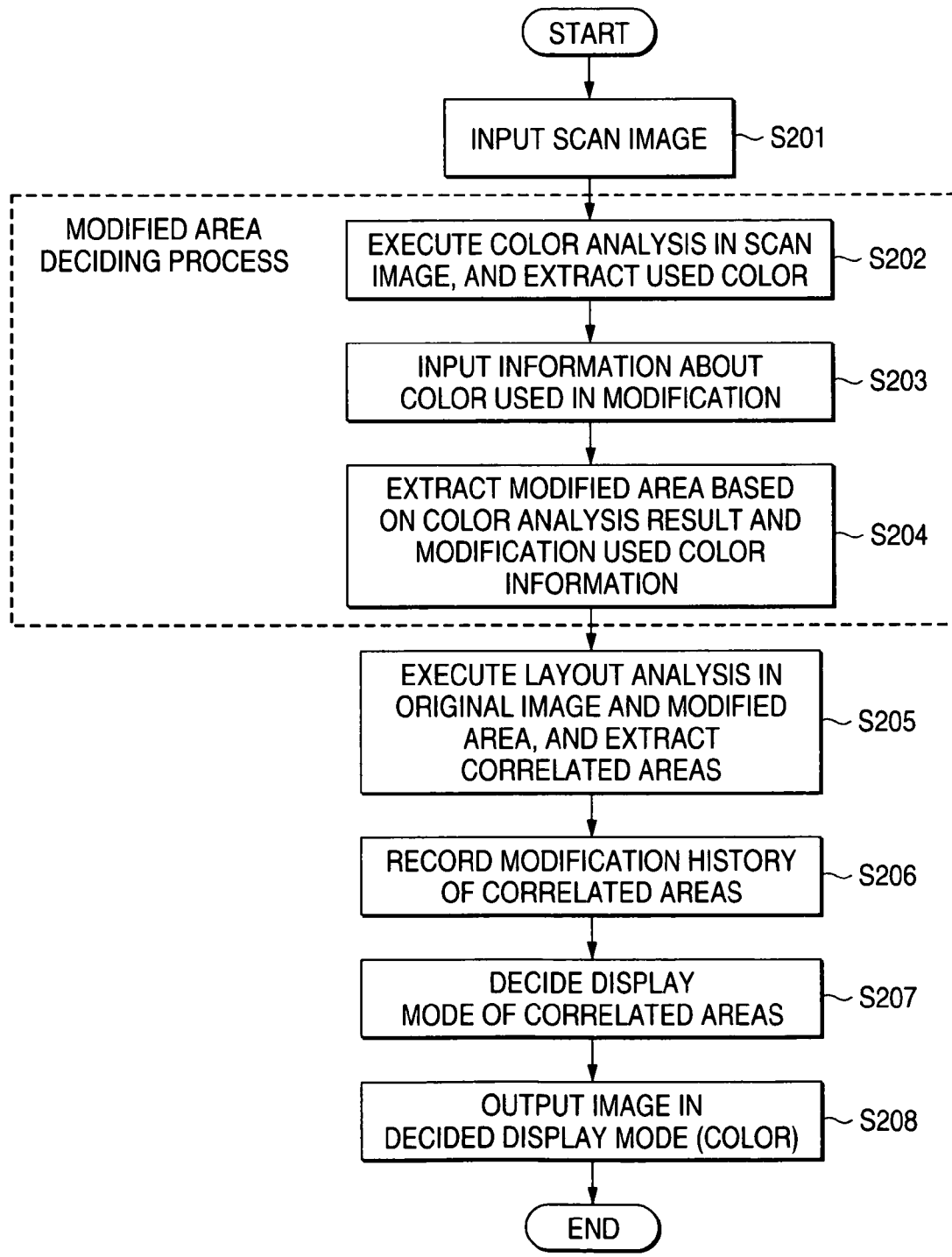
FIG. 15 is a flowchart explaining a process sequence executed by the image processing system according to one embodiment of the invention.

Next, processing executed when the modified area deciding 220 executes the process in (a) the case where the original document or image is not present, which has already been explained with reference to FIG. 4, will be explained with reference to FIG. 15 hereunder.

A difference from the process flow in FIG. 13 resides in steps S202 to S204. Since the processing executed in other steps S201 and steps S205 to S208 are similar to those executed in steps S101 and steps S105 to S108 in the process flow in FIG. 13, their explanation will be omitted herein.

The processing executed in step S202 to S204, i.e., the processing executed by the modified area deciding unit 220 in (b) the case where the original document or image is not present, which has already been explained with reference to FIG. 4, will be explained hereunder.

When the original document or image is not present, the difference extraction between two images of the original document image the postscript document image cannot be carried out. Therefore, the processing of extracting the data, which is decide as the postscript information, only from the postscript document is executed. In step S202, the image analysis (color analysis) of the postscript document is executed, and a color used in the postscript document is extracted. For example, the analyzed result such as black and red can be obtained.

Then, in step S203, the color information to be discriminated as the postscript information is input. For example, the color information (red) is input by the operator. In this case, the setting to decide the color information except the black, for example, as the postscript information may be employed without the operator's input of the color information. In the case of this configuration, the external input of the color information is not needed.

In step S204, the pixels having the designated color are extracted from the postscript document, based on the result of the image analysis (color analysis) of the postscript document and the color information input in step S202 or the already-set color information. Alternately, the rectangular area containing the pixels having the designated color is extracted.

The processing executed in step S205 et seq. are similar to those in step S105 et seq. in the process flow in FIG. 13.

The image processing system according to the above-described embodiments of the invention is constricted to specify the related information based on the postscript information, and output not only the postscript information but also the original information related to the postscript information and other postscript information in displaying the data. Therefore, the user can look at the postscript information as well as the related information, and thus can easily grasp the meaning of the postscript information and grasp the overall information.

Figure 16:
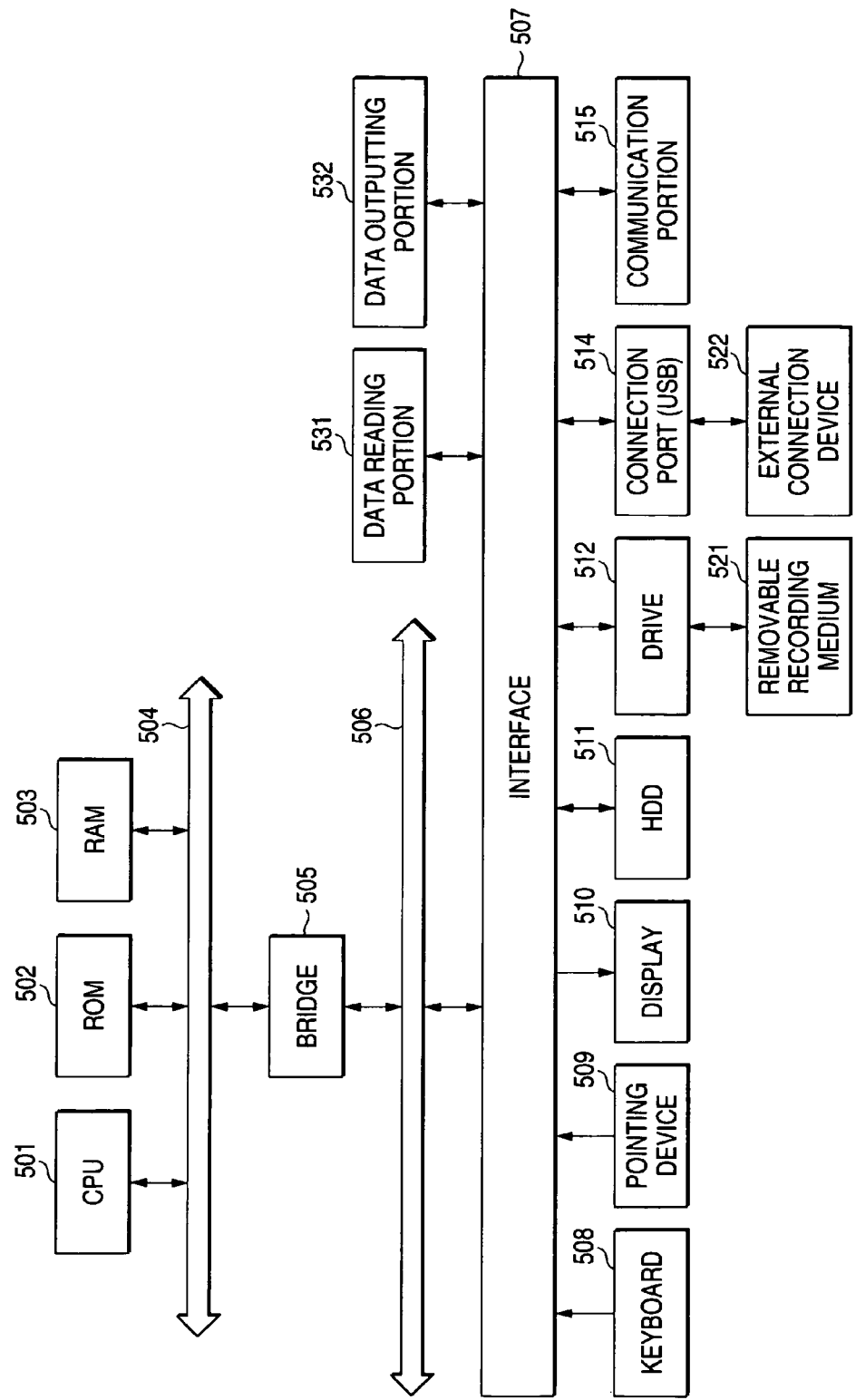
FIG. 16 is a view explaining an example of a hardware configuration of the image processing system according to one embodiment of the invention.

Finally, an example of a hardware configuration of the image processing system of the invention will be explained with reference to FIG. 16 hereunder. The configuration shown in FIG. 16 shows the image processing system constructed by PC, for example, and shows the hardware configuration having a data reading portion 531 such as the scanner, and a data outputting portion 532 such as the printer.

A CPU (Central Processing Unit) 501 is a controlling portion that executes various data processings explained in the above embodiment, i.e., the modified area deciding process, the modified area correlation deciding process, the generation of the correlation history information table, the information display controlling process, etc., in compliance with the computer program on which execution sequences of respective processes are described.

A ROM (Read Only Memory) 502 stores the programs used by the CPU 501, the operation parameters, and the like. A RAM (Random Access Memory) 503 stores the programs used during the execution of the CPU 501, the parameters that are changed appropriately during the execution, and the like. These memories are connected mutually via a host bus 504 that is composed of the CPU bus.

The host bus 504 is connected to an external bus 506 such as PCI (Peripheral Component Interconnect/Interface) via a bridge 505.

A keyboard 508 and a pointing device 509 are input devices that are operated by the user. A display 510 is constructed by the liquid crystal display device, CRT (Cathode Ray Tube), and displays various information as the texts or image information.

A HDD (Hard Disk Drive) 511 contains the hard disk, and drive the hard disk to record or reproduce the program or the information executed by the CPU 501. The hard disk stores the input data of the original document and the postscript document, the correlation history information table, and the like therein. In addition, various computer programs such as various data processing programs, etc. are stored in the HDD.

A drive 512 reads the data or the program recorded on a removable recording medium 521 such as the magnetic disk, the optical disk, the magneto optical disk, the semiconductor memory when installed, and supplies the data or the program to the RAM 503 via an interface 507, the external bus 506, the bridge 505, and the host bus 504. The removable recording medium 521 can be utilized as the data recording area that is similar to the hard disk.

A connection port 514 is a port to which an external connection device 522 is connected, and has a connection portion such as USB, IEEE1394. The connection port 514 is connected to the CPU 501, etc. via the interface 507, and the external bus 506, the bridge 505, the host bus 540, and the like. A communication portion 515 is connected to the network, and executes a data communication process with the outside. The data reading portion 531 executes the document reading process, and also the data outputting portion 532 executes the document data outputting process.

In this case, the example of the hardware configuration of the image processing system shown in FIG. 16 shows merely one system example. The image processing system of the invention is not limited to the configuration shown in FIG. 16, and any configuration may be employed if such configuration can execute the processes explained in the above embodiments.

With the above, the invention is explained in detail with reference to the particular embodiments. However, it is obvious for the skilled person in the art that the modification or the substitution of the above embodiments can be applied without departing from the gist of the invention. In other words, the invention is disclosed for the purpose of illustration only, and thus the invention should not be interpreted limitatively. In order to decide the gist of the invention, the column of claim should be considered.

Here, a series of processes explained in the specification can be carried out by the hardware or the software or the composite configurations of them. When the process to be executed by the software is carried out, the program on which the process sequence is recorded may be installed into the memory in the computer, which is built in the dedicated hardware, to execute or the program may be installed into the general-purpose computer, which can execute various processes, to execute.

For example, the program can be recorded in advance in the hard disk or the ROM (Read Only Memory) as the recording medium. Otherwise, the program can be stored (recorded) temporarily or permanently in the removable recording medium such as the flexible disk, the CD-ROM (Compact Disc Read Only Memory), the DVD (Digital Versatile Disc), the magnetic disk, the semiconductor memory. Such removable recording medium can be provided as the so-called package software.

In this case, the program can be not only installed into the computer from the above removable recording medium but also transmitted to the computer from the download side via radio or transmitted to the computer through the network such as LAN (Local Area Network), the Internet via cable. Then, the computer can receive the program being transmitted in this way, and install the program into the recording medium such as the built-in hard disk.

Here, various processes set forth in the specification can be not only executed in time series according to the description but also executed in parallel or individually according to a processing capability of the process executing system or as the case may be. Also, the word "system" in this specification means a logical set configuration of plural system, and is not limited to the system whose constituent devices are installed in the same enclosure.

As explained above, according to the configuration described above, the image processing system for executing the extracting and providing processes of the postscript information is constructed to extract the modified areas containing the pixel areas that are decided as the postscript information, sense the areas containing the related information corresponding to the modified areas, extract the areas containing the related information in the layout unit or the character string unit, and select the areas containing the postscript information and the related information of the postscript information and display such areas on the displaying unit. Therefore, the user can look at not only the postscript information but also the original information related to the postscript information and other postscript information, and thus the system capable of grasping effectively the meaning of the postscript information and the important information can be provided.

What is claimed is:

1. An image processing system, comprising:
 a modified area deciding unit that executes processing of deciding a modified area in input image data, which has a previous image and a postscript information to the previous image, the modified area containing an area, which is distinguished as the postscript information;

a modified area correlation deciding unit that specifies a related information area of the previous image corresponding to the modified area, the modified area correlation deciding unit that executes processing of deciding a correlation between the modified area and the related information area;

a display selecting unit that selects a display mode of the postscript information and related information of the related information area, the display mode being set based on the correlation; and a displaying unit that executes processing of displaying the postscript information and the related information in response to the display mode selected by the display selecting unit, wherein the postscript information is added based on a description which is in the previous image and the modified area, and the modified area correlation deciding unit executes the processing of deciding the correlation, based on one of (i) a connecting line for connecting the modified area and another area that includes the description, and (ii) a similar identifier in the modified area and the other area that includes the description.

2. The image processing system according to claim 1, further comprising:

a correlation history holding unit that stores the correlation information between the modified area and the related information area, wherein:

the correlation history holding unit holds correlation history information in which plural pieces of postscript information and the related information corresponding to plural pieces of input image data are set as history data corresponding to the input image data.

3. The image processing system according to claim 1, wherein the modified area deciding unit executes the processing of deciding the modified area based on differences among plural pieces of input image data.

4. The image processing system according to claim 1, wherein the modified area deciding unit executes the processing of deciding the modified area based on color information contained in a single piece of the input image data.

5. The image processing system according to claim 4, wherein the modified area deciding unit analyzes an input image for a previous image in a modified area, which includes a postscript information to the previous image, and separates the input image into the previous image in the modified area.

6. The image processing system according to claim 1, wherein:

the input image data has a layout comprising a plurality of sections, the modified area correlation deciding unit specifies the related information area corresponding to the modified area in units of the section, and the modified area correlation deciding unit executes processing of deciding at least one of a correlation between the section and the postscript information, a correlation between the section and a correlation between the postscript information.

7. The image processing system according to claim 1, wherein:

the input image data has a plurality of character string areas, the modified area correlation deciding unit specifies the related information area corresponding to the modified area in units of the character string, and the modified area correlation deciding unit executes processing of deciding at least one of a correlation between the character string area and the postscript information, a correlation between the character string units and a correlation between the postscript information.

8. The image processing system according to claim 1, wherein the display selecting unit applies different display modes to plural pieces of the postscript information corresponding to plural pieces of input image data, respectively.

9. The image processing system according to claim 1, wherein the display selecting unit enables to output plural pieces of postscript information corresponding to plural pieces of input image data selectively.

10. The image processing system according to claim 1, wherein the displaying unit executes displaying a hypertext in which the related information is set as a hyperlink.

11. An image processing method, comprising:

executing processing of deciding a modified area in input image data, which has an previous image and a postscript information to the previous image, the modified area containing an area, which is distinguished as the postscript information, the postscript information being added based on a description which is in the previous image and the modified area, specifying a related information area of the previous image corresponding to the decided modified area;

executing processing of deciding a correlation between the modified area and the related information area, based on one of (i) a connecting line for connecting the modified area and another area that includes the description, and (ii) a similar identifier in the modified area and the other area that includes the description;

selecting a display mode of the postscript information and related information of the related information area, the display mode being set based on the decided correlation; and executing processing of displaying the postscript information and the related information in response to the selected display mode.

12. The image processing method according to claim 11, further comprising:

storing the decided correlation information, wherein:

in the storing, correlation history information is held in which plural pieces of postscript information and the related information corresponding to plural pieces of input image data are set as history data corresponding to the input image data.

13. The image processing method according to claim 11, wherein the processing of deciding the modified area, is executed based on differences among plural pieces of input image data.

14. The image processing method according to claim 11, wherein the processing of deciding the modified area is executed based on color information contained in a single piece of the input image data.

15. The image processing method according to claim 11, wherein the processing of deciding the correlation is executed based on one of (i) a connecting line for connecting the modified area and another area and (ii) a similar identifier in the modified area and another area.

16. The image processing method according to claim 11, wherein:

the input image data has a layout comprising a plurality of sections, the related information area corresponding to the modified area decided is specified in unit of the section, and in the processing of deciding the correlation, processing of deciding at least one of a correlation between the section and the postscript information, a correlation between the sections and a correlation between the postscript information is executed.

17. The image processing method according to claim 11, wherein the input image data has a plurality of character string areas, the related information area corresponding to the modified area is specified in units of the character string, and in the processing of deciding the correlation, processing of deciding at least one of a correlation between the character string area and the postscript information, a correlation between the character string units and a correlation between the postscript information is decided.

18. The image processing method according to claim 11, further comprising:

applying different display modes to plural pieces of the postscript information corresponding to plural pieces of input image data, respectively.

19. The image processing method according to claim 11, further comprising:

outputting plural pieces of postscript information corresponding to plural pieces of input image data selectively.

20. The image processing method according to claim 11, wherein the processing of displaying comprises displaying a hypertext in which the related information is set as a hyperlink.

21. A storage medium readable by a computer, the storage medium storing a program of instructions executable by the computer to perform a function for data managing, the function comprising:

executing processing of deciding a modified area in input image data, which has a previous image and a postscript information to the previous image, the modified area containing an area, which is distinguished as the postscript information, the postscript information being added based on a description which is in the previous image and the modified area, specifying a related information area of the previous image corresponding to the decided modified area, based on one of (i) a connecting line for connecting the modified area and another area that includes the description, and (ii) a similar identifier in the modified area and the other area that includes the description;

executing processing of deciding a correlation between the modified area and the related information area;

selecting a display mode of the postscript information and related information of the related information area, the display mode being set based on the decided correlation between the mutual areas; and executing processing of displaying the postscript information and the related information in response to the selected display mode.

* * * * *